Oct. 19, 1937.  O. F. MAEHR  2,096,554
SPRAYING DEVICE SYSTEM
Filed Dec. 18, 1934  2 Sheets-Sheet 1
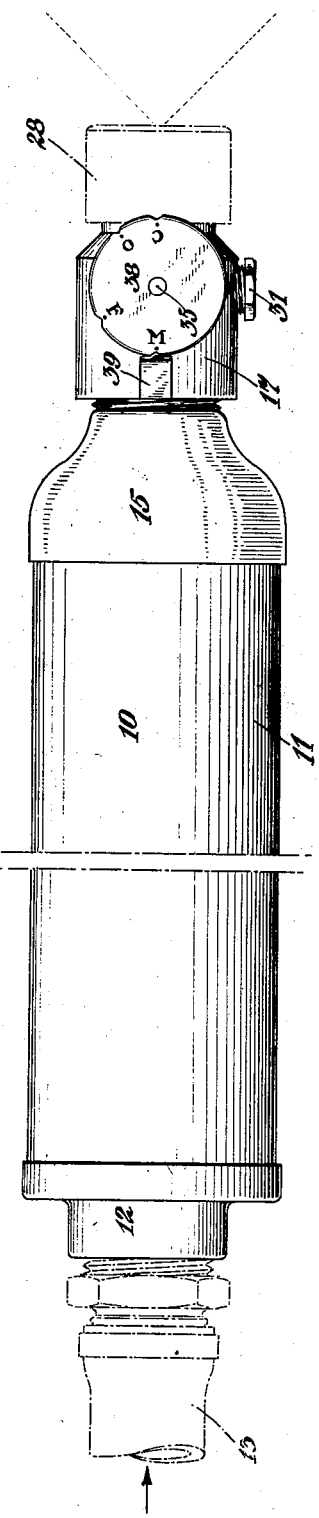
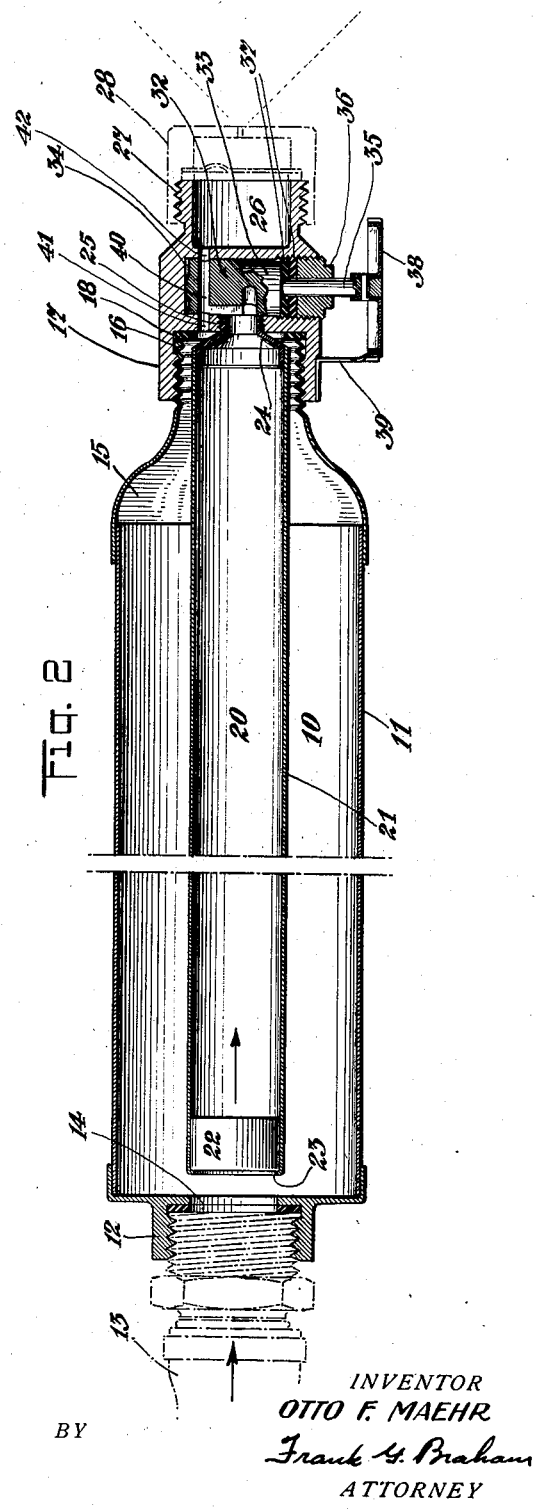
INVENTOR
OTTO F. MAEHR
BY Frank G. Braham
ATTORNEY

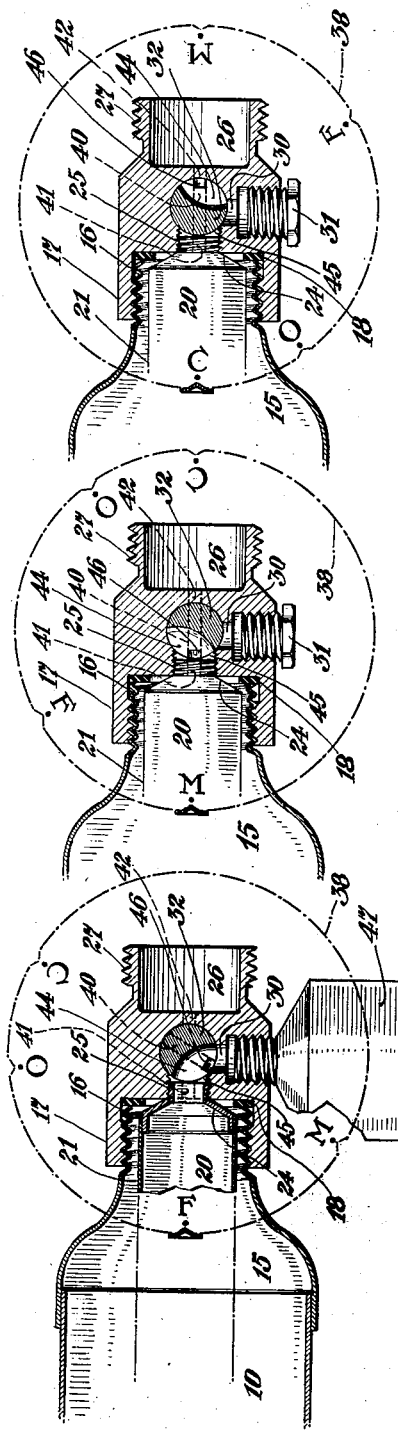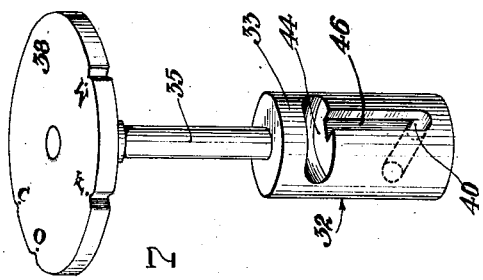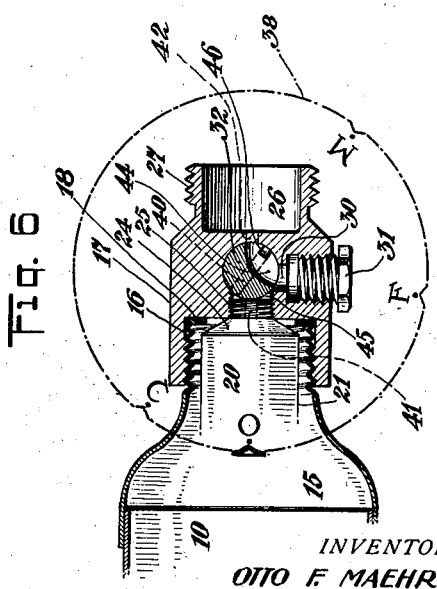

Patented Oct. 19, 1937

2,096,554

UNITED STATES PATENT OFFICE 2,096,554

SPRAYING DEVICE SYSTEM

Otto Frank Maehr, Brooklyn, N. Y., assignor to Garden Insecticide Corporation, a corporation of New York Application December 18, 1934, Serial No. 757,985

4 Claims. (Cl. 299—85)

This invention relates to a spraying device, and especially to a hydraulic spraying device adapted to commingle solutions of various kinds with a stream of water discharged from a hose or a water line.

A device of this kind may be put to many different uses. For example, the solution may be a nitrate solution to be sprayed upon lawns; it may be an insecticide or a germicide to be sprayed upon trees or growing vegetation, or it may be a fire extinguishing solution to be discharged upon a fire.

It is a primary object of the present invention to provide a device of this character which is capable of being adjusted to permit the discharge of a stream of water either alone or mixed with a solution stored in a container, and to permit the container to be refilled without disassociating it from the device.

It is a further object of the invention to provide a device of this character with a mixing chamber to insure a thorough commingling of the water with the solution.

In accordance with the present invention, the above and other objects are attained by storing the solution in a container from which it may be forced by pressure. This storage container is positioned within a pressure vessel one end of which is adapted to be connected to a source of water under pressure and the other end of which is connected to a discharge head having a valve adapted and arranged to establish or disestablish communication between the pressure vessel and a mixing chamber; between the pressure vessel, the storage container and the mixing chamber, or between the storage container and a charging port through which a desired solution may be introduced into the storage container. When the valve is adjusted to establish communication between the pressure vessel and the mixing chamber, a stream of water is delivered into the mixing chamber from whence it is discharged through a nozzle. When the valve is adjusted to establish communication between the pressure vessel, the storage container and the mixing chamber, both water and solution are delivered into the mixing chamber where they are swirled about to insure a thorough commingling before being discharged through the nozzle; and when the valve is adjusted to establish communication between the storage container and the charging port, the storage container may be recharged without being removed from the pressure vessel.

For a clear understanding of the invention reference may be made to the accompanying drawings, in which:

Fig. 1 is a top view of a spraying device embodying the principles of the present invention, this view being broken across the length of the device to more clearly show the relationship of parts;

Fig. 2 is a side view, in section, this view being also broken across the length of the device to more clearly show the relationship of parts.

Fig. 3 is a top view, in section, showing the valve adjusted to establish communication between the charging port and the storage container;

Fig. 4 is a top view, in section, showing the valve adjusted to establish communication between the pressure vessel, the storage container and the mixing chamber;

Fig. 5 is a top view, in section, showing the valve adjusted to establish communication between the pressure vessel and the mixing chamber;

Fig. 6 is a top view, in section, showing the valve closed; and

Fig. 7 is a perspective view of the valve and of the visible indicator associated therewith.

As shown in the drawings, a pressure vessel 10 comprises a tubular member 11. The rear end of the tubular member 11 is capped with an internally threaded flange 12 which permits the device to be connected to a source of water under pressure, such as a hose 13, and to render this connection fluid tight, when made, a gasket 14 is positioned in the flange 12 at the base of the threaded portion. The forward end of the tubular member 11 is capped by a funnel shaped member 15 threaded into an axially aligned recess 16 in the rear end of a discharge control head 17, and to render this connection fluid tight a gasket 18 is interposed therebetween.

A storage container 20, in which a desired solution may be stored, is positioned in the pressure vessel 10 and it comprises a cylinder 21 having a movable plunger 22 therein. The rear end of the cylinder 21 is bent inwardly to form a retaining shoulder 23 which serves to keep the plunger 22 in the cylinder, and the forward end of the cylinder 21 is capped by a funnel shaped member 24 threaded into a recess 25 formed in the central portion of the base of the axially aligned recess 16, in the discharge control head 17.

The forward end of the control head 17 is recessed to form a mixing chamber 26, and the walls of this recess are provided with external threads 27 which permit a discharge nozzle 28 to be readily connected thereto.

Between its recessed ends, the control head 17 is provided with a charging port 30 and with a valve 32; the port 30 being adapted to be closed by a sealing plug 31 and the valve 32 being capable of adjustment to establish or disestablish communication between the mixing chamber 26 and the pressure vessel 10; to establish or disestablish communication between the mixing chamber 26 and both the pressure vessel 10 and the storage container 20; or to establish or disestablish communication between the charging port 30 and the storage container 20.

As shown more clearly in Figs. 2 and 7, the valve 32 comprises a cylindrical body portion 33, journaled in the inner end of a recess 34, and a valve stem 35, journaled in a gland 36 screwed into the outer end of the recess 34; and to render the valve 32 fluid tight a pair of packing rings 37 are positioned about the stem 35 between the gland 36 and the body portion 33 of the valve 32. The valve stem 35 is provided with a turning disk 38 having the letters C, O, F and M, stamped thereon which, when taken in connection with a pointer 39 carried by the control head 17, indicates the position to which the valve 32 is adjusted, the letter C indicating that the valve 32 is so adjusted that communication is established between the pressure vessel 10 and the mixing chamber 26; the letter O indicating that the valve 32 is closed; the letter F indicating that the valve 32 is so adjusted that communication is established between the storage container 20 and the charging port 30; and the letter M, which in the present embodiment of the invention is positioned opposite the letter C, indicating that the valve 32 is so adjusted that communication is established between the mixing chamber 26 and both the pressure vessel 10 and the storage container 20.

When the valve is so adjusted that the letter C on the turning disk 38 is opposite the pointer 39 (see Fig. 5) a transverse passageway 40 through the cylindrical body portion 33 of the valve 32 establishes communication between a passageway 41 which leads from the pressure vessel 10 to the recess 34 in which the valve 32 is journaled and a similar passageway 42 which leads from the opposite side of the recess 34 to the mixing chamber 26, thus permitting water only to be delivered into the mixing chamber 26 from whence it is discharged through the nozzle 28. When the valve is so adjusted that the letter M on the turning disk 38 is opposite the pointer 39 (see Fig. 4) a recessed sector 44 in the body portion of the valve establishes communication between a passageway 45 which leads from the storage container 20 to the recess 34 in which the valve 32 is journaled and a longitudinal groove 46 which leads from the sector 44 to the transverse groove 40 which, when the valve 32 is in this position, also establishes communication between the pressure vessel 10 and the mixing chamber through the communicating passageways 41 and 42. Under these conditions water from the pressure vessel 10 is delivered into the mixing chamber 26 and the pressure of the water in the pressure vessel 10 forces the movable plunger 22 forwardly with the result that the solution in the cylinder 21 is forced through the communicating passageway 45 into the recessed sector 44, and through the longitudinal groove 46 into the stream of water whereby it is carried forwardly into the mixing chamber 26. In the mixing chamber 26 the water and solution are swirled about, thus insuring a thorough commingling of the two before being discharged through the nozzle 28. When the valve 32 is so adjusted that the letter F on the turning disk 38 is opposite the pointer 39 (see Fig. 3) the recessed sector 44 establishes communication between the charging port 30 and the communicating passageway 45 which leads from the storage container 20 to the recess 34 in which the valve 32 is journaled, thus permitting the storage container 20 to be recharged without being removed from the pressure vessel 10; the recharging being accomplished by removing the sealing plug 31 from the charging port 30 and threading therein the end of a charging tube 47 from which the solution may be forced by pressure through communication thus established into the storage container 20. When the valve 32 is so adjusted the transverse passageway 40 is thrown out of alignment with the communicating passageway 42 which leads from the recess 34 in which the valve 32 is journaled to the mixing chamber 26 thus preventing the passage of either water or solution through the control head 17. When the valve 32 is so adjusted that the letter O on the turning disk 38 is opposite the pointer 39 (see Fig. 6) the recessed sector 44 is thrown out of engagement with the communicating passageway 45 which leads from the recess 34 in which the valve 32 is journaled to the storage container 20 and the transverse passageway 40 is thrown out of alignment with the communicating passageway 42 which leads from the recess 34 in which the valve 32 is journaled to the mixing chamber 26 in which case the valve 32 is entirely shut off.

Having thus described my invention, I claim:

1. In a spraying device, the combination of a pressure vessel, a storage container positioned in said vessel, a discharge control head having a charging port, and a valve for establishing communication through the head from the pressure vessel or from both the pressure vessel and the storage container or through the head from the charging port to the storage container.

2. In a spraying device, the combination of a pressure vessel, a storage container positioned in said vessel and charged with a solution, a discharge control head having a mixing chamber and a charging port, and a valve for establishing or disestablishing a passageway through said head and into said chamber from said pressure vessel, from both the pressure vessel and the storage container or from the charging port to the storage container.

3. In a spraying device, the combination of a pressure vessel, a cylinder charged with a solution positioned in said vessel and having a plunger moveable therein under pressure to force said solution from said cylinder, a discharge control head, and a valve for establishing or disestablishing a passageway through said head from the vessel or from both the vessel and the cylinder.

4. In a spraying device, the combination of a pressure vessel, a cylinder charged with a solution and having a plunger moveable therein under pressure to force said solution from said cylinder, a discharge control head having a charging port, and a valve for establishing or disestablishing a passageway through said head from the vessel, from both the vessel and the cylinder or from the charging port to the cylinder.

OTTO FRANK MAEHR.